United States Patent [19]
Yonetani et al.

[11] Patent Number: 5,526,127
[45] Date of Patent: Jun. 11, 1996

[54] VIDEO TAPE RECORDER WHICH ALLOWS PRESET PROGRAM RECORDING

[75] Inventors: Naoki Yonetani, Daitou; Tatsuaki Doumura, Osaka, both of Japan

[73] Assignee: Sanyo Electric Co., Ltd., Japan

[21] Appl. No.: 350,585

[22] Filed: Dec. 6, 1994

Related U.S. Application Data

[63] Continuation of Ser. No. 122,017, Sep. 15, 1993, abandoned.

[30] Foreign Application Priority Data

Sep. 22, 1992 [JP] Japan ..................... 4-252901

[51] Int. Cl.⁶ .................................................. H04N 5/782
[52] U.S. Cl. ......................... 358/335; 360/33.1; 348/906
[58] Field of Search ........................... 358/335; 360/33.1, 360/27; 348/906, 731, 734; 455/185.1, 186.1, 186.2; H04N 5/76, 5/782

[56] References Cited

U.S. PATENT DOCUMENTS

| | | | |
|---|---|---|---|
| 3,982,065 | 9/1976 | Barnaby et al. | 178/5.8 R |
| 4,706,121 | 11/1987 | Young | 358/335 |
| 4,787,063 | 11/1988 | Muguet | 358/335 |
| 4,879,611 | 11/1989 | Fukui et al. | 358/335 |
| 4,894,714 | 1/1990 | Christis | 358/147 |
| 4,908,707 | 3/1990 | Kinghorn | 358/147 |
| 4,991,025 | 2/1991 | Eigeldinger | 358/310 |

FOREIGN PATENT DOCUMENTS

| | | |
|---|---|---|
| 0255108 | 2/1988 | European Pat. Off. . |
| 0312798 | 4/1989 | European Pat. Off. . |
| 0393955 | 10/1990 | European Pat. Off. ........ H04N 5/782 |
| 0420123 | 4/1991 | European Pat. Off. . |
| 0492298 | 7/1992 | European Pat. Off. . |
| 3335082 | 4/1985 | Germany . |
| 2256545 | 12/1992 | United Kingdom . |
| WO8700380 | 1/1987 | WIPO . |
| WO9007844 | 7/1990 | WIPO . |
| WO9010351 | 9/1990 | WIPO . |
| WO9119391 | 12/1991 | WIPO . |

OTHER PUBLICATIONS

Edgar J. Wilson, "Programme Delivery Controll For Simplified Home Video Recording", *IEEE Transactions on Consumer Electronics*, 37(1991) Nov., No. 4, New York, pp. 737–745.

*Primary Examiner*—Tommy P. Chin
*Assistant Examiner*—Huy Nguyen
*Attorney, Agent, or Firm*—Peter L. Michaelson

[57] ABSTRACT

The video tape recorder includes key input unit for inputting the "G-code", decoder for decoding the "G-code", teletext signal extracting circuit for extracting the program list including the VPS code multiplexed on the vertical blanking period from the video signal, and teletext control unit and preset control unit, implemented by a microcomputer, for carrying out a predetermined control. The "G-code" input from key input unit 11 is decoded by decoder. Preset control unit causes teletext control unit to extract the VPS code of the program specified by the "G-code" from the program list transmitted by the broadcasting station specified by the "G-code". Recording is controlled based on the extracted VPS code. Therefore, even when the time of broadcasting of the preset program is changed by the broadcasting station, the program can be recorded accordingly.

9 Claims, 12 Drawing Sheets

| Date | CH | Start | Stop | ... | VPS | Title |
|------|----|----|------|-----|-----|-------|
| 21.09 | 01 | 12:00 | 12:30 | | ON | NEWS:ON |
| — — | — — | — — : — — | — — : — — | | OFF | — — — — :OFF |

VIDEO TAPE RECORDER WHICH ALLOWS PRESET PROGRAM RECORDING

CROSS REFERENCE TO RELATED APPLICATION

This application is a continuation of patent application entitled "Video Tape Recorder Which Allows Preset Program Recording" filed on Sep. 15, 1993 as Ser. No. 08/122,017, now abandoned.

BACKGROUND OF THE INVENTION

1. Field of the Invention

The present invention relates to a video tape recorder (VTR) which allows preset program recording, and more particularly to a video tape recorder which allows preset program recording by the VPT (Video Programming by TELETEXT) system by inputting program preset codes such as "G-code".

2. Description of the Background Art

Timer program recording is the most popular recording system using a VTR. In timer program recording, a user sets in advance the channel, date, time and the like of a desired program to be subsequently broadcast, and recording is conducted automatically based on the preset data. However, when the broadcast time of the program is advanced, deferred, or postponed by the TV station, the desired program cannot be recorded appropriately.

In order to solve such a problem, the VPT system has been employed in Europe. Lately, TV broadcasting employs the teletext system utilizing a vertical blanking period. The details of the teletext technology is disclosed in U.S. Pat. No. 3,982,065.

Figure 8:
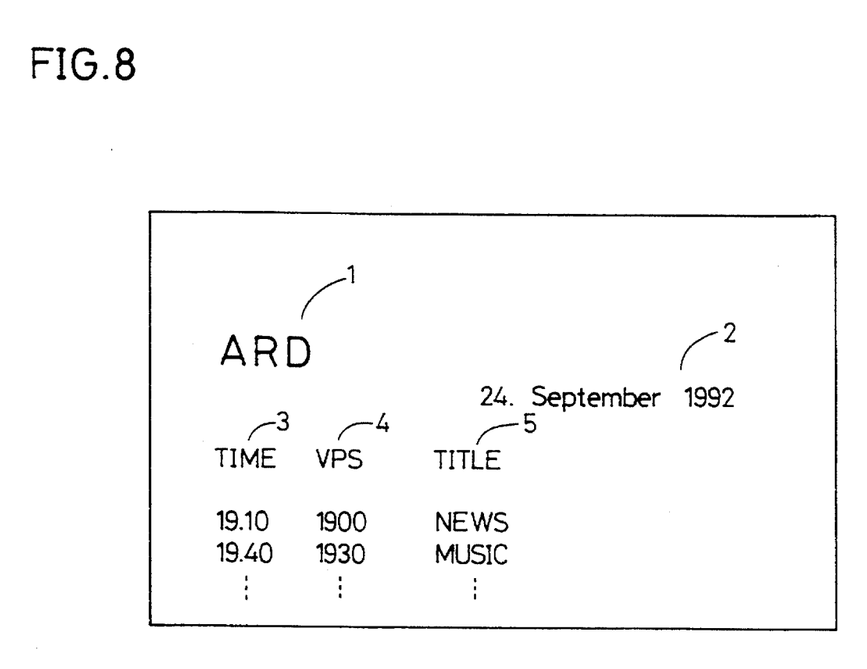
FIG. 8 shows a program list displayed on a display screen by teletext service.

FIG. 8 shows an example of the TV program list transmitted as one of teletext services. The program list includes a date 2, time 3, a program identifying code 4, and a title 5 of every program to be broadcast within, for example, a week by a TV station 1. Program identifying code 4 is multiplexed on a video signal of the program during broadcasting to distinguish the program from other programs.

In Germany, for example, a VPS (Video Program System) code is transmitted as the program identifying code. The VPS code is multiplexed on the sixteenth horizontal data line in the first field of a video signal.

In United Kingdom, a PDC (Program Delivery Control) code is transmitted as the program identifying code. The PDC code is multiplexed on the 7th through 22nd horizontal data lines in the first field of the video signal and on the 320th through 335th horizontal data lines in the second field of the video signal.

In the United States, an EDS (Extended Data Service) code is transmitted as the program identifying code. The EDS code is multiplexed on the 21st horizontal data line in the second field of the video signal.

The VPT system utilizes the above-mentioned program list for preset program recording. The details of the VPT system is disclosed, for example, in DE3335082C2.

When preset program recording is conducted by the VPT system, a program list is transmitted from a broadcasting station and displayed on the display screen. A user examines the program list and selects a desired program by moving a cursor and the like, whereby necessary data for preset program recording are taken in the VTR and decoded.

When the decoded preset data include the program identifying code such as VPS code, PDC code or EDS code, recording is preferentially conducted based on the program identifying code. More particularly, when the time draws near to the scheduled broadcast time of the preset program, a program identifying code which has been transmitted from the broadcasting station of the program is received, and the program identifying code is compared with the program identifying code which has been already set. Recording starts when those codes coincide with each other, and recording continues until the program identifying code transmitted from the broadcasting station disappears, or until it comes to be non-coincident with the set program identifying code. Therefore, even when the broadcast time of the program is changed by the broadcasting station, the program can be recorded accordingly.

The program identifying code which is transmitted from the broadcasting station is monitored continuously from 8:00 pm the previous day to 4:00 am the next day of the scheduled broadcast date of the preset program, for example. The time period in which the program identifying code is monitored is called the valid period. The program identifying code included in the program list is valid only during the valid period corresponding to a particular program.

When the decoded preset data does not include a program identifying code, the normal timer reservation mode is set, so that recording is conducted based on the set starting and the ending broadcast times. More particularly, the current time is compared with the set starting broadcast time, and recording starts when those times coincide with each other, while recording is completed when the current time coincides with the set ending broadcast time. The related technology is disclosed in European Patent No. 0255108B1.

Meanwhile, the program preset system called "VCR•PLUS" has been utilized recently in Europe which allows simplified operation of timer program recording. According to the VCR•PLUS system, the preset data such as the broadcasting station, date and time of a program are compressed mathematically, and converted into a program preset code having eight digits called a "G-code". Such program preset codes are allotted to respective programs and printed on newspapers and magazines. The "G-code" is input to VTR by a user and decoded into preset data including the name of broadcasting station, date and time. Thus, the normal timer preset mode is set, whereby recording is controlled based on the preset data. More particularly, the current time is compared with the decoded starting broadcast time, and recording starts when those coincide with each other. When the current time and the decoded ending broadcast time coincide with each other, recording is completed.

As described above, the VPT system is superior to the VCR•PLUS system in that a desired program can be always recorded more appropriately. Therefore, a user normally selects preset program recording by the VPT system.

When setting the preset data by the VPT system, it is necessary to receive the teletext data and reproduce the program list. Since the teletext data are multiplexed on the video signals in the vertical blanking period, it normally takes several tens of seconds to acquire all the data. Therefore, preset operation by the VPT system is time consuming. On the other hand, preset operation by the VCR•PLUS system is very simple, as it requires the input of the "G-code" only.

In this respect, the preset data are often set by the VCR•PLUS system even for a program having a program identifying code. In this case, if broadcast time of the program is advanced, deferred or postponed by the broadcasting station, recording is not properly conducted accordingly even though the program identifying code is allotted to the preset program. Consequently, sometimes the beginning or the ending of the preset program is not recorded, or the program which is totally different from the preset program is recorded.

Generally, every broadcasting station transmits the program list covering only one week, so that preset program recording by the VPT system is not possible for such a program that is to be broadcast at a time more than one week later. Meanwhile, "G-codes" for the programs to be broadcasted at a time more than one week later are printed on a magazine and the like. Therefore, the VCR•PLUS system has been the only way for presetting recording of the program which is broadcast sometime more than one week later. Consequently, if the broadcast time of the program is changed by the broadcasting station, the program cannot be recorded appropriately.

SUMMARY OF THE INVENTION

An object of the present invention is to provide a VTR which can record a program appropriately even if the broadcasting time of the program is changed by the broadcasting station, when the program is preset for recording by using a program preset code.

Another object of the present invention is to provide a VTR which can record a program appropriately even when the program identifying code is unknown as in the case when the program is to be broadcast at a time more than one week later and the program is preset using a program preset code, just as in the case the program is preset using a program identifying code.

A further object of the present invention is to provide a VTR which can record a program appropriately by converting a program preset code thereof into a corresponding program identifying code if only the program to be recorded is preset using the program preset code.

A still further object of the present invention is to provide a VTR in which a title of a program to be recorded can automatically be inserted before recording the program.

A video tape recorder according to the present invention includes an input unit, a decoder, a teletext receiving circuit, a checking unit, a memory, a setting unit and a recording unit.

The input unit is for inputting a program preset code including encoded preset data of broadcasting station, date and time of a desired program to be broadcast. The program preset code is decoded into the preset data by the decoder.

The teletext receiving circuit receives a program list multiplexed on a broadcasting signal of the broadcasting station specified by the preset data. The program list includes a date, time and a program identifying code of each program which is to be broadcast within a predetermined time period in the future by the broadcasting station specified by the preset data. The program identifying code is multiplexed on the broadcast signal of the program for distinguishing the program from other programs while the program is broadcast.

The checking unit checks the date and time in the preset data against those of a certain program, in the program list. After checking by the checking unit, if the date and time in the preset data coincide with those of the program in the program list, the setting unit sets at least the program identifying code of the program into the memory.

The recording unit records the program when the program identifying code which is multiplexed on the broadcast signal of the program coincides with the program identifying code set by the setting unit.

Consequently, a major advantage of the present invention is that the program can be recorded appropriately even if the broadcast time of the program is changed by the broadcasting station and the program to be recorded is preset using the program preset code, because, once the program preset code is input, the preset data corresponding thereto are checked against the program list included in the teletext, and the program identifying code corresponding to the preset data is extracted for setting.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A VTR according to embodiments of the present invention will be described in detail referring to figures.

[First Embodiment]

Figure 1:
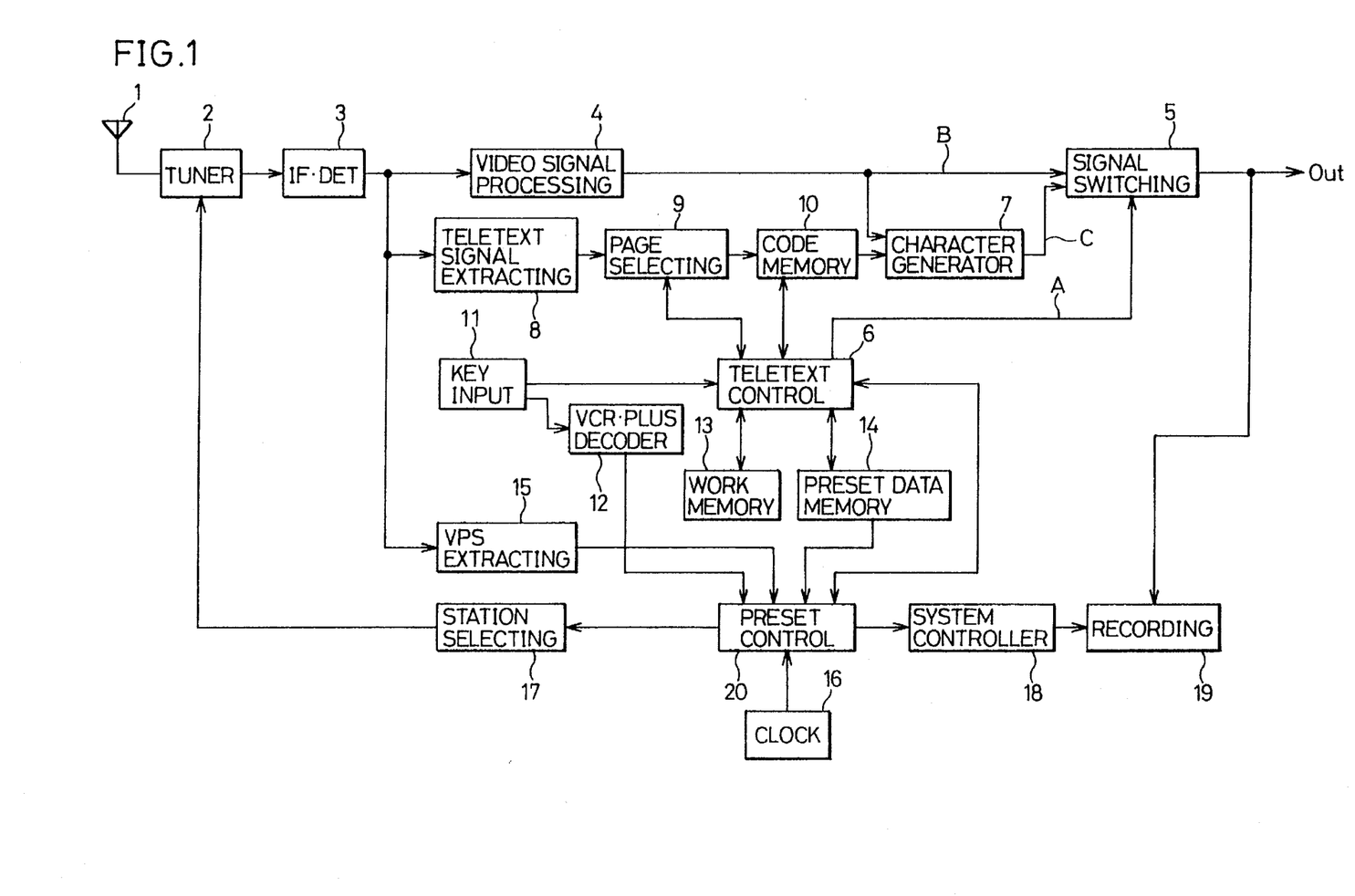
FIG. 1 is a block diagram schematically showing a structure of a VTR according to the first through third embodiments of the present invention.

FIG. 1 is a block diagram schematically showing a VTR according to a first embodiment of the present invention. Referring to FIG. 1, the VTR includes a tuner 2 receiving a broadcast signal captured by an antenna 1, a video intermediate frequency and detection circuit 3, and a video signal processing circuit 4. The broadcast signal captured by antenna 1 is selected by tuner 2. A video signal included in the selected broadcast signal is converted to an intermediate frequency by video intermediate frequency and detection circuit 3, and amplified, and detected. Then, the video signal is subjected to a predetermined processing by video signal processing circuit 4.

The VTR further includes a signal switching circuit 5, a teletext control unit 6, a character generator 7, a teletext signal extracting circuit 8, a page selecting circuit 9, and a code memory 10.

Teletext signal extracting circuit 8 extracts a teletext signal multiplexed on a vertical blanking period of the video signal supplied by video intermediate frequency and detection circuit 3. The teletext signal extracted by extracting circuit 8 is supplied to page selecting circuit 9. Page selecting circuit 9 extracts only the teletext signal of the page designated by teletext control unit 6, and herein only the data of program list is extracted from the teletext data. At first, teletext control unit 6 designates the first page of the program list. More particularly, the first page number of the teletext where the program list exists is preset for each channel in teletext control unit 6. Teletext control unit 6 is implemented by, for example, a microcomputer.

The teletext data of the specific page selected by page selecting circuit 9 is stored as a character code in code memory 10 in response to a control signal from teletext control unit 6. Character generator 7 converts the character code supplied from code memory 10 to a video signal C and supplies the same to signal switching circuit 5. Character generator 7 further combines the video signal supplied from video signal processing circuit 4 and the video signal produced in response to the character code supplied from code memory 10, and supplies the combined signal to signal switching circuit 5 as video signal C. Signal switching circuit 5 selects either one of a video signal B supplied from video signal processing circuit 4 or video signal C supplied from character generator 7 in response to switching signal A supplied from teletext control unit 6, and outputs the selected signal.

In addition, teletext control unit 6 can write a character code directly to code memory 10 for displaying an arbitrary character on the display screen.

The VTR further includes a key input unit 11, a VCR•PLUS decoder 12, a work memory 13, and a preset data memory 14.

Program preset keys such as those keys using the VPT system and the VCR•PLUS system are provided in key input unit 11. VCR•PLUS decoder 12 decodes a "G-code" input from key input unit 11 into the preset data such as the broadcasting station (channel), date, and the starting and ending broadcast times. Work memory 13 temporarily stores the program list necessary for preset program processing. Preset data memory 14 stores the data necessary for preset program recording such as the channel, the date, the starting and ending broadcast times, the VPS code and the title of the program.

The VTR further includes a VPS extracting circuit 15, a clock circuit 16, a station selecting circuit 17, a system controller 18, a recording circuit 19, and a preset control unit 20.

VPS extracting circuit 15 extracts a VPS code included in the vertical blanking period of the video signal from the video signals supplied from video intermediate frequency and detection circuit 3. Clock circuit 16 counts the current date and time and the like.

Station selecting circuit 17 causes tuner 2 to select the specified broadcasting station in response to a control signal from preset control unit 20. System controller 18 controls recording circuit 19 in response to the control signal from preset control unit 20. Recording circuit 19 records the video signal supplied from signal switching circuit 5 in response to the control signal supplied from system controller 18.

Preset control unit 20 controls station selecting circuit 17 and system controller 18 based on the data supplied from VCR•PLUS decoder 12, VPS extracting circuit 15, preset data memory 14 and clock circuit 16. Preset control unit 20, as well as teletext control unit 6, is also implemented by the microcomputer. Teletext control unit 6 and preset control unit 20 exchange data with each other.

Figure 2A:
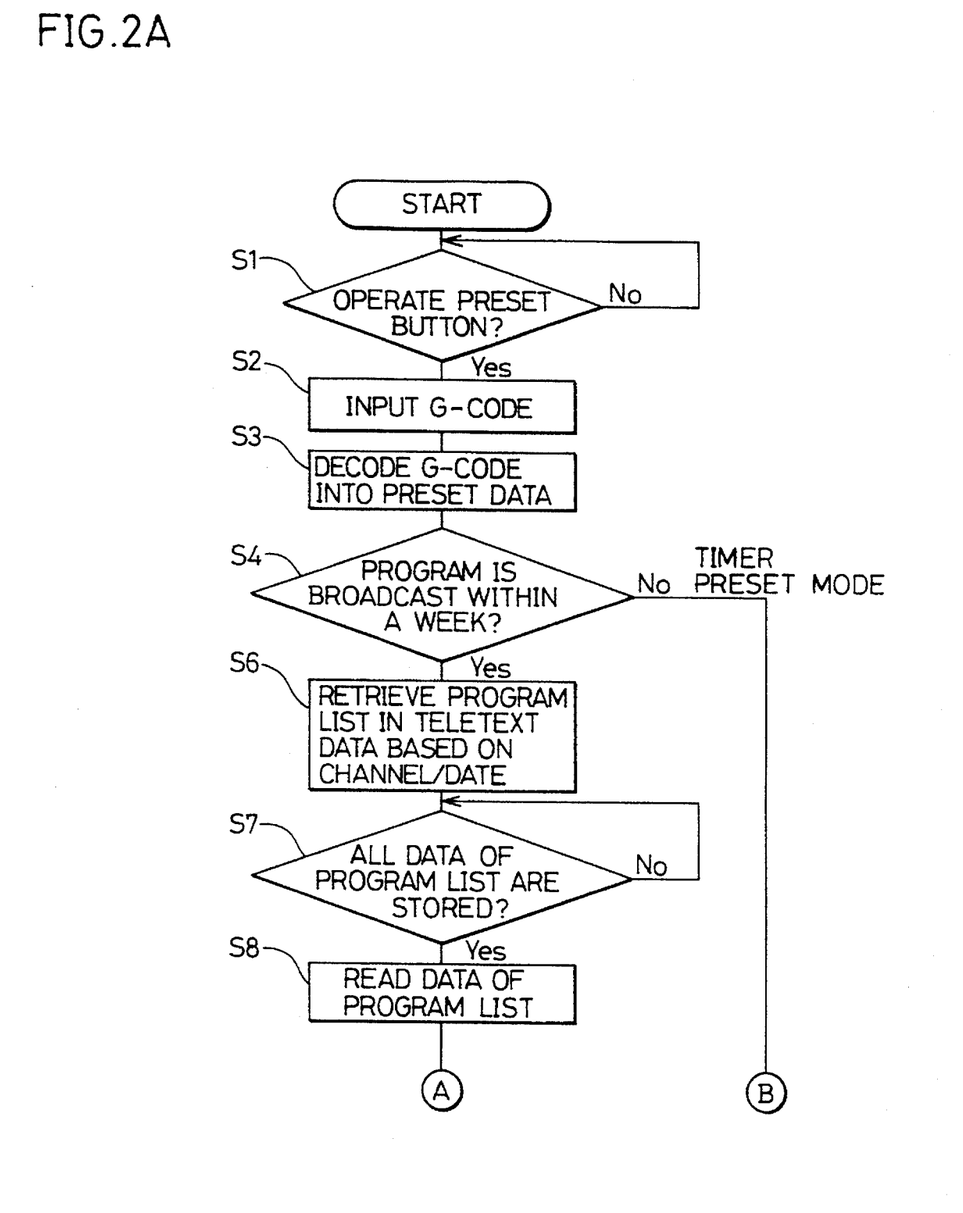
FIG. 2A and 2B are flow charts showing an operation of VTR presetting according to the first embodiment of the present invention.
Figure 2B:
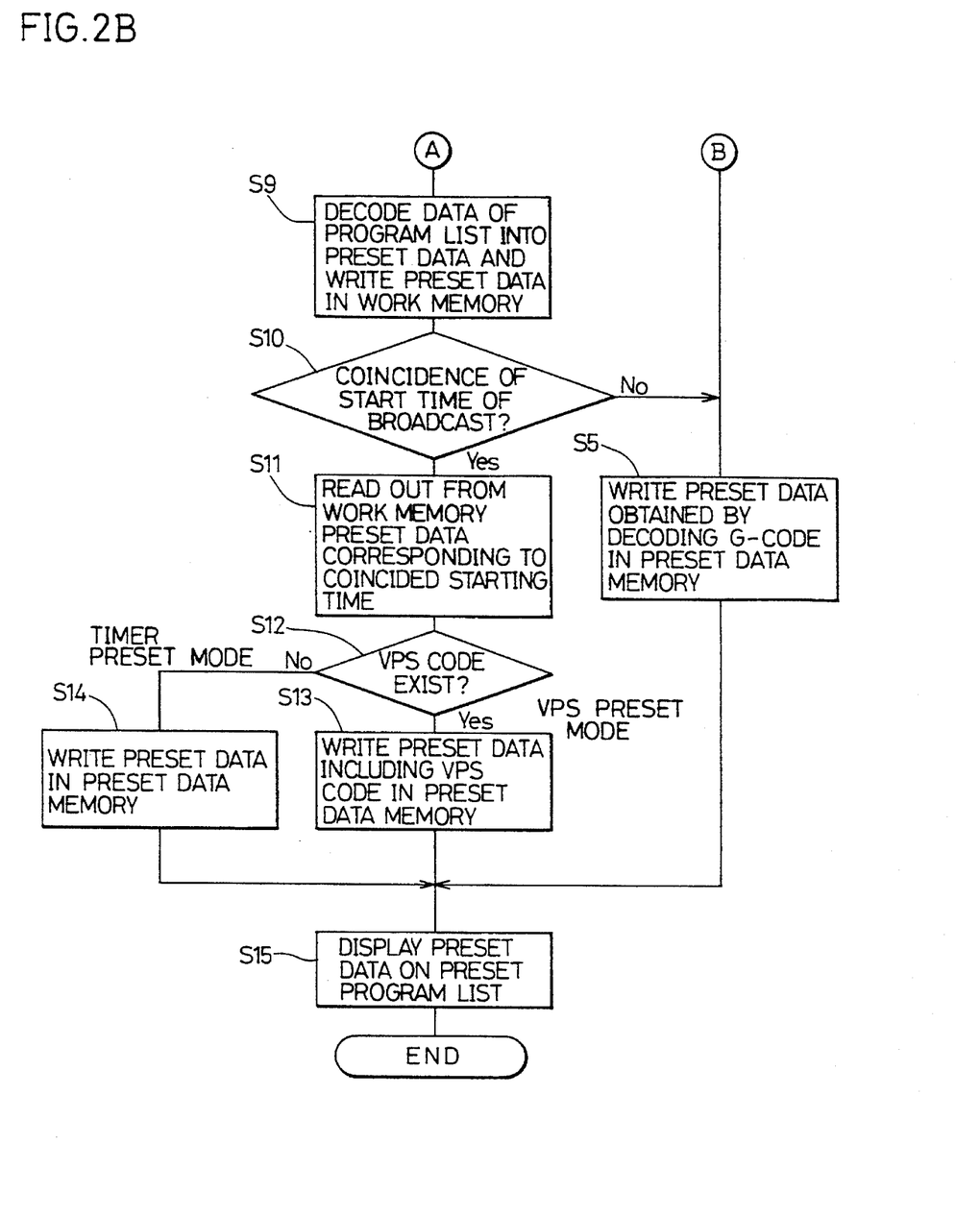

Program preset operation by the VTR will be described below referring to the flow chart shown in FIG. 2A and 2B. Simultaneous reference should also be made to FIG. 1 throughout the entire remaining discussion.

In the program presetting using the VCR•PLUS system, in step S1, a user operates preset buttons in key input unit 11, and accordingly the program preset mode is started by the VCR•PLUS system.

In step S2, the user inputs a "G-code" corresponding to a program to be recorded. The "G-code" includes the preset data, such as the broadcasting station (channel), date and time of the program scheduled to be broadcast that are compressed mathematically, and is printed in newspapers, magazines or the like.

In step S3, the input "G-code" is decoded into the program preset data such as the name of the broadcasting station, date, and the starting time and ending broadcast times by VCR•PLUS decoder 12.

In step S4, the date decoded by preset control unit 20 and the date of clock circuit 16 are compared with each other for determining whether or not the program is to be broadcast within a week. This is because the broadcasting station usually transmits the program list which covers only a week so that the program data which is to be broadcast sometime more than one week later are not included in the teletext.

If the program is to be broadcast more than a week later, the preset data, decoded based on the "G-code", are supplied from preset control unit 20 to teletext control unit 6 and written in preset data memory 14 by teletext control unit 6 in step S5. In this case, the timer preset mode starts and presetting is completed.

Meanwhile, if the program is to be broadcast within one week, preset control unit 20 controls station selecting circuit 17 based on the decoded data of broadcasting station in step S6, whereby station selecting circuit 17 causes tuner 2 to select the broadcasting station. Then, preset control unit 20 controls teletext control unit 6 for retrieving the program list among the teletext supplied from the selected broadcasting station. In response to this, teletext control unit 6 designates the first page of the program list to page selection circuit 9, and then retrieves the page of the program list where a desired program is included based on the date of broadcast.

The retrieved page data are successively stored in code memory 10, and in step S7, teletext control unit 6 determines whether or not the data of the program list are completely stored in code memory 10.

Once all of the program list data are stored in code memory 10, teletext control unit 6 reads the data of the program list in step S8, and decodes the data of the program list into a specific preset data and stores the preset data in work memory 13 in step S9. The preset data decoded by teletext control unit 6 includes the channel, date, the starting time and ending broadcast times, the VPS code and the title of the program.

When the preset data, equivalent to one page of the selected program list, are written in work memory 13, the starting broadcast times obtained by decoding the "G-code" and the starting broadcast times written in work memory 13 are checked successively by teletext control unit 6.

Consequently, if, as detected the starting broadcast times is the same as that of decoded "G-code" from work memory 13, the preset data of the program corresponding to the starting time is read from work memory 13 by teletext control unit 6 in step S11.

In step S12, teletext control unit 6 determines whether or not the VPS code exists in the read preset data. If the VPS code is found, the VPS preset mode is set, and the preset data including the VPS code are written in preset data memory 14 in step S13. Meanwhile, if the VPS code is not found, the time preset mode is set, so that the preset data not including the VPS code are written in preset data memory 14 in step S14.

Figure 3:
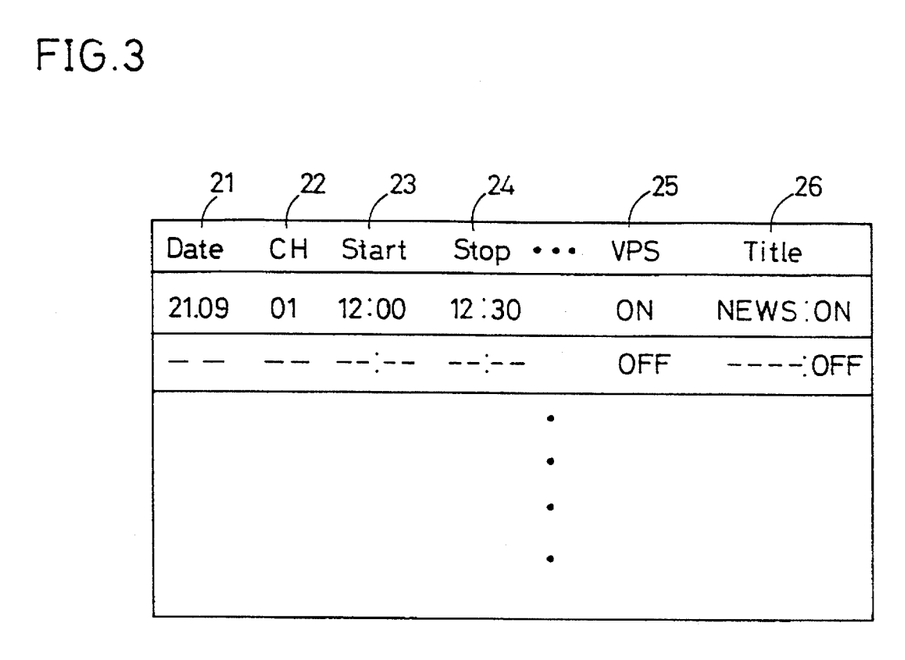
FIG. 3 shows a preset program list displayed on a display screen in the operation shown in FIG. 2.

Then, in step S15, teletext control unit 6 writes the preset data written in preset data memory 14 into code memory 10, and supplies switching signal A to signal switching circuit 5 causing signal switching circuit 5 to select video signal C supplied from character generator 7. Thus, a preset program list is indicated on the display screen as shown in FIG. 3. The scheduled broadcast date 21 of the program, the channel 22, the starting broadcast time 23, the ending broadcast time 24, the VPS code 25, and the title 26 are displayed in the preset program list. When the program list in the teletext includes the VPS code, automatically the VPS preset mode is set, and "ON" is indicated in the preset program list. On the other hand, if the program list does not include the VPS code, the timer preset mode is set, and "OFF" indication is given.

If the program list includes the title, "ON" is indicated automatically, so that the title is recorded for a predetermined time period before the program is recorded, which will be described later. If the program list does not include the title, "OFF" is automatically indicated. Even when the program list includes the title, if the user does not want the title to be recorded, the user can turn off the title recording mode by operating key input unit 11.

The operation of recording based on the preset data set as above will be described referring to FIGS. 4A and 4B.

First, the VPS preset mode will be described referring to FIG. 4A.

In step S40, only the preset data of the program having the VPS set "ON" are read out successively from preset data memory 14 by preset control unit 20. Preset control unit 20 determines whether the preset data are valid or not based on the current date and time in clock circuit 16. For example, it is determined whether or not the current date and time are included in the time period from 8:00 pm of the previous day to 4:00 am of the next day of the date set in the preset data.

If preset data are valid, station selecting circuit 17 is controlled by preset control unit 20 based on the channel set in the preset data in step S41. The VPS code, which is multiplexed onto the vertical blanking period of the video signal broadcast by the broadcasting station selected by station selecting circuit 17, is extracted by VPS extracting circuit 15.

In step S42, preset control unit 20 determines whether or not the extracted VPS code coincides with the read VPS code. If they do not coincide with each other, the next preset data are read from preset data memory 14 again in step S40. On the other hand, if they coincide, a channel which is currently selected by station selecting circuit 17 is locked in step S43, and at that time preset control unit 20 supplies to teletext control unit 6 the information regarding on which preset data recording is carried out.

Then, teletext control unit 6 reads out the preset data, which is to be carried out based on the information from preset control unit 20, from preset data memory 14, and determines whether or not the title recording mode in the preset data is "ON" in step S44.

If the title recording mode is "OFF", recording is carried out without recording the title of the program. On the other hand, if the title recording mode is "ON", the title of the program is written in code memory 10 in step S45. The title written in code memory 10 is converted into the video signal by character generator 7 and combined with the video signal supplied from video signal processing circuit 4. In step S46, signal switching circuit 5 selects video signal C supplied from character generator 7 in response to switching signal A supplied from teletext control unit 6. At the same time, system controller 18 causes recording circuit 19 to start recording in response to the control signal from preset control unit 20, whereby recording circuit 19 records the video signal supplied from signal switching circuit 5.

Signal switching circuit 5 selects video signal C supplied from character generator 7 for a predetermined time period after the start of recording, and once the predetermined time has passed in step S47, it selects video signal B from video signal processing circuit 4 in step S48, thereby completing recording of the title. As shown in FIG. 5, the title of the program 27 is recorded superimposed on a TV screen 28.

After that, preset control unit 20 continues comparing the VPS code from VPS extracting circuit 15 with the VPS code set in the preset data, and accordingly recording continues as long as those codes coincide with each other. When the VPS code from VPS extracting circuit 15 ceases to be coincident with the VPS code in the preset data, preset control unit 20 causes recording circuit 19 to complete recording through controller 18. Once recording is completed, the preset data which has been used for the recording is erased.

The timer of preset mode will be described referring to the flow chart shown in FIG. 4B. The flow chart shown in FIG. 4B is to be inserted between A and B in the flow chart shown in FIG. 4A instead of the intervening steps shown in the latter figure.

In step S50, preset control unit 20 reads out the first of data then to be broadcast of the preset data in which the VPS preset mode is set "OFF", i.e. timer preset mode is set. In step S51, the starting broadcast time in the preset data is compared with the current time in clock circuit 16 by preset control unit 20. If those times coincide with each other, in step S52, preset control unit 20 controls station selecting circuit 17 based on the channel set in the preset data, and at the same time supplies to teletext control unit 6 the information regarding on which preset data recording is carried out.

Figure 4A:
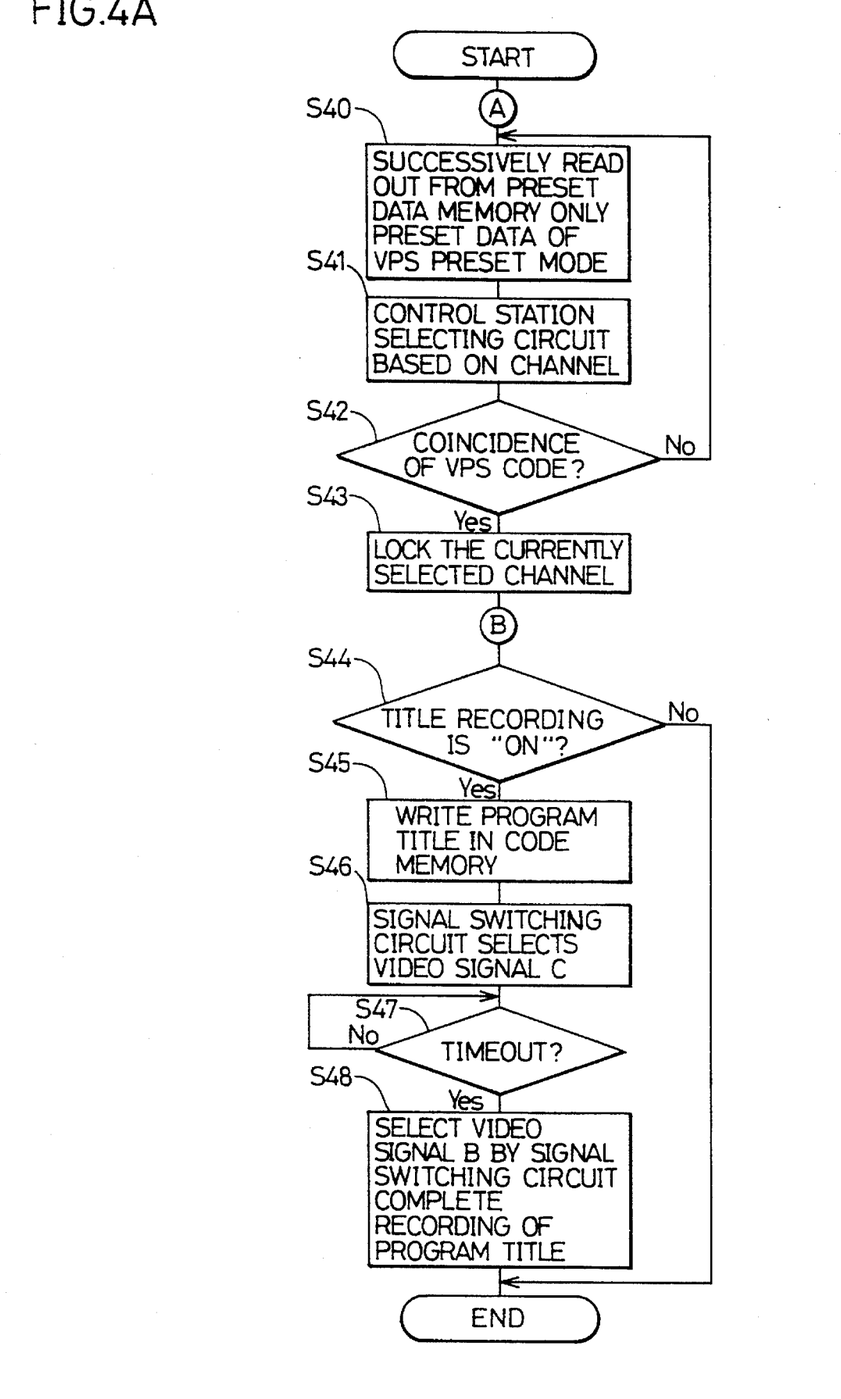
FIG. 4A is a flow chart showing an operation of the VTR recording according to the first embodiment of the present invention, specifically showing an operation in the VPT preset mode.
Figure 4B:
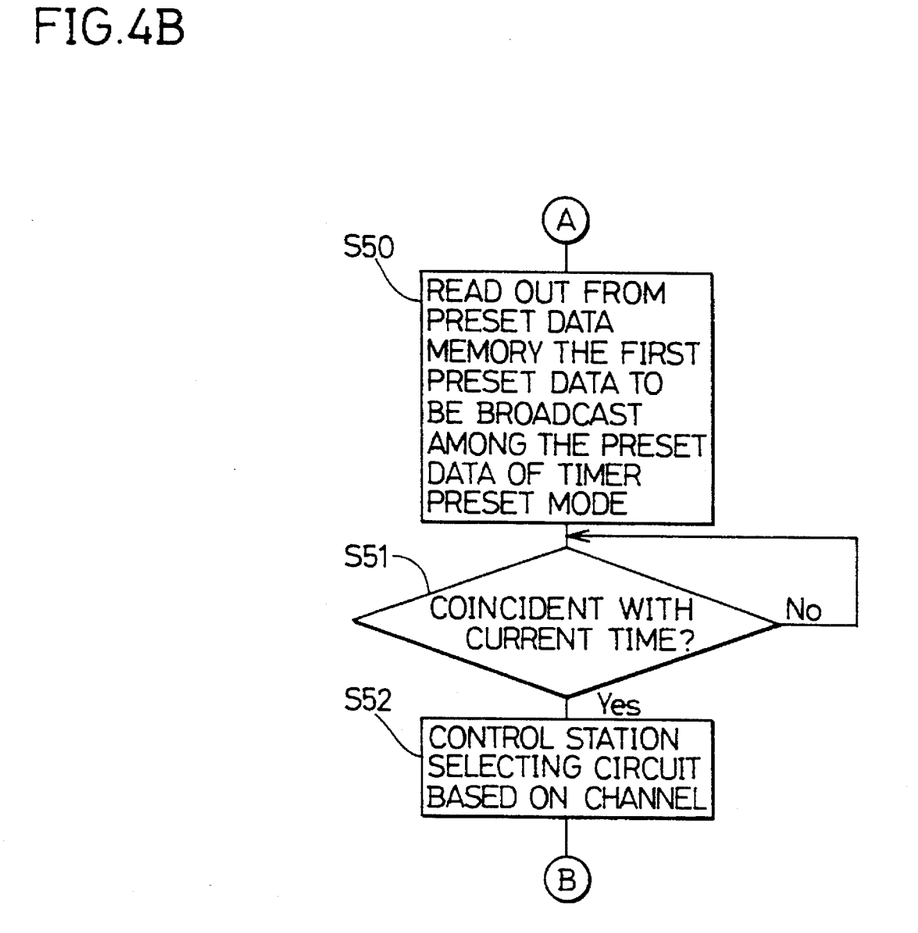
FIG. 4B is a flow chart showing an operation of recording in the timer preset mode, corresponding to steps 540–543 between A and B shown in FIG. 4A.
Figure 5:
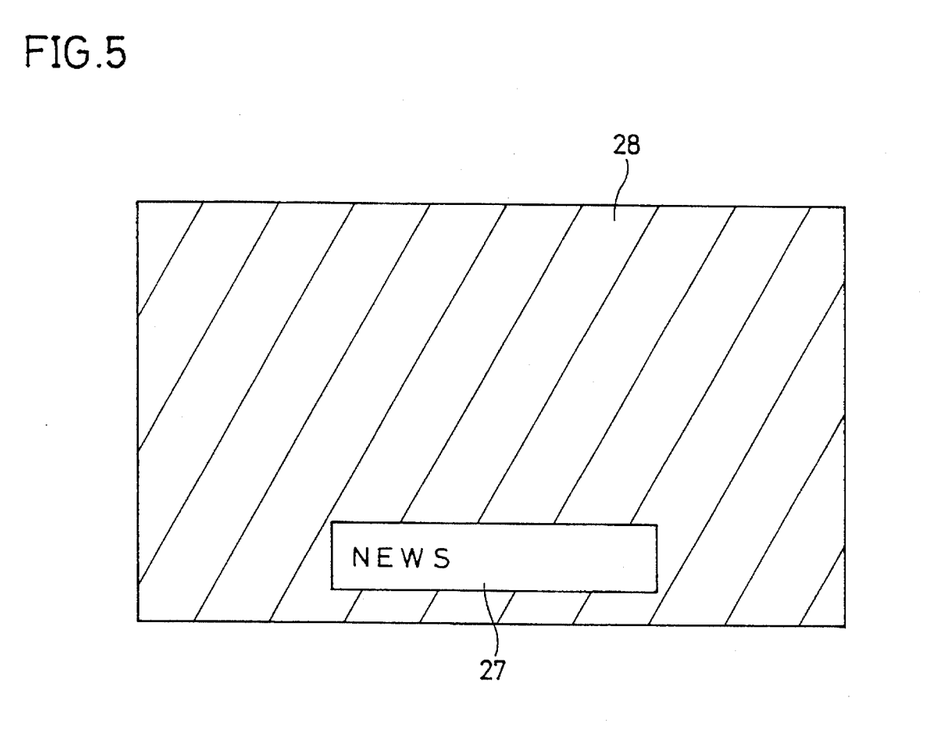
FIG. 5 shows the display when a title of a program is recorded in the operation shown in FIG. 4A.

The subsequent operation is similar to the title recording operation shown in FIG. 4A, and the description thereof will not be given.

Meanwhile, even when the VPS code is included in the program list, if the VPS preset mode is set "OFF" by manual operation, the timer preset mode will be carried out as above.

When the preset is carried out directly by the VPT system, a certain program is selected from the program list by key input unit 11 using a cursor, and preset data of the program including the VPS code is stored in preset data memory 14. Then, recording is carried out similarly to the above-described VPS preset mode.

The above-described VTR can record the program appropriately even when the program is preset by the "G-code" and the time of broadcast is changed by the broadcasting station, because recording is carried out in the VPS preset mode corresponding to the "G-code".

Though the VPS code is allotted to each program in the above described, the PDC code or the EDS code may be allotted instead of the VPS code.

[Second Embodiment]

The VTR according to the second embodiment of the present invention will be described. Since the block diagram showing the entire structure of the VTR according to the second embodiment is similar to that of the first embodiment, reference should also be simultaneously made to the block diagram shown in FIG. 1.

Figure 6A:
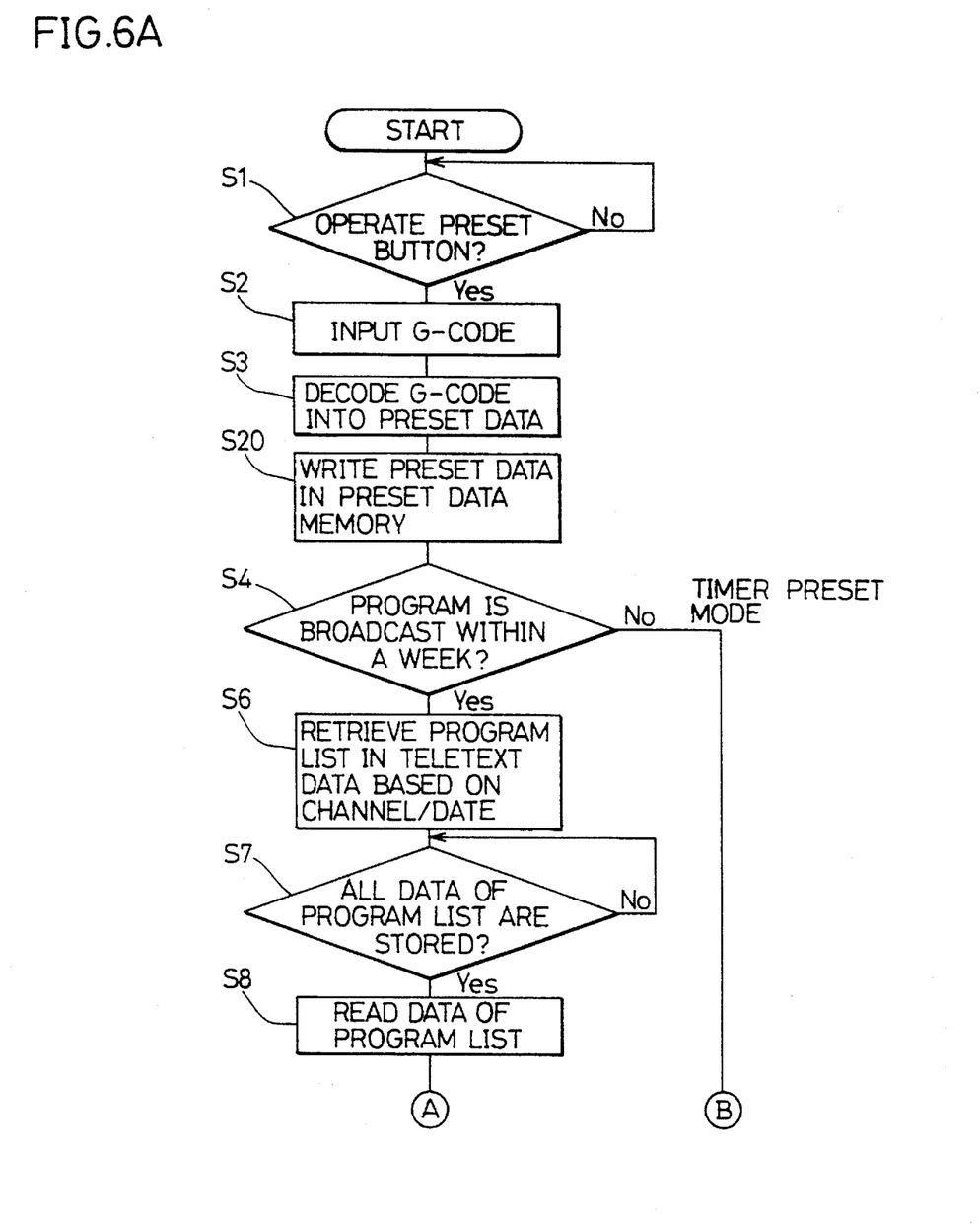
FIG. 6A and 6B are flow charts showing an operation of the VTR according to the second embodiment of the present invention.
Figure 6B:
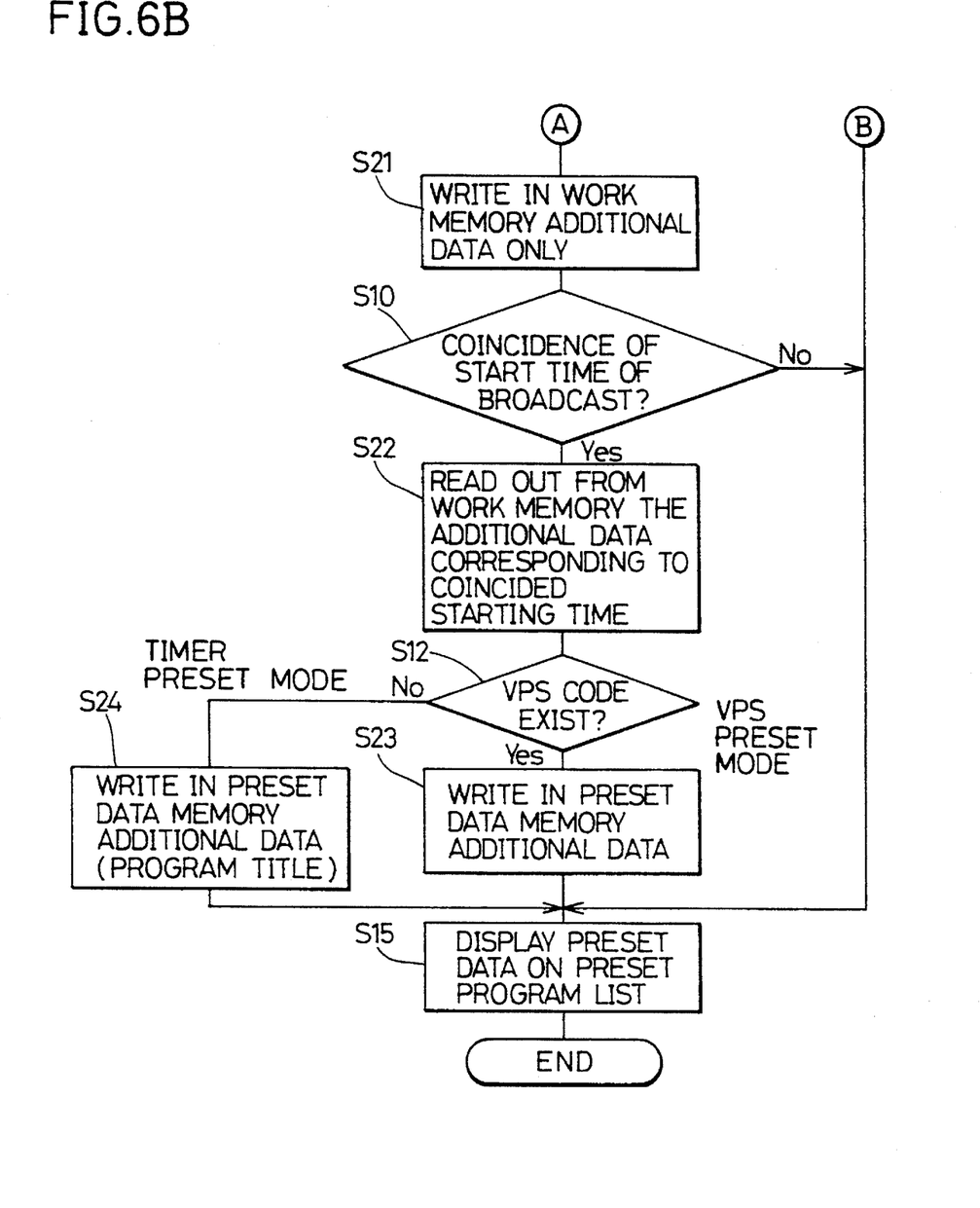

FIG. 6A and 6B are flow charts showing the operation of recording a desired program by the VTR according to the second embodiment. Same reference characters are given to the steps corresponding to those shown in the flow charts of FIG. 2A and 2B.

In steps S1–S3, the "G-code" input from key input unit 11 is decoded to a corresponding preset data.

In step S20, preset control unit 20 stores the preset data supplied from decoder 12 to preset data memory 14 through teletext control unit 6. The step S20 is different from the above-described first embodiment.

In steps S4–S8, it is determined whether or not the broadcast date in the preset data is within a week. If it is not within a week, the timer preset mode starts. In this case, the preset data is not required to be written in preset data memory 14 as in step S5 of the first embodiment because the necessary preset data have already been written in preset data memory 14. On the other hand, if the program is broadcast within a week, the program list corresponding to the channel and the broadcast date set in the preset data is written in code memory 10.

In step S21, teletext control unit 6 writes to work memory 13 the starting broadcast time corresponding to the program, and the additional data including the data, i.e. the VPS code and the title of the program, other than those that are already written in preset data memory 14 out of the preset data stored in code memory 10.

In step S10, teletext control unit 6 compares the starting broadcast time obtained by decoding the "G-code" with the starting broadcast time written in work memory 13 successively, and when coincidence is detected, only the additional data of the program corresponding to that starting time are read out from work memory 13 in step S22.

In step S12, teletext control unit 6 determines whether or not the read additional data includes the VPS code. The VPS preset mode is set when the VPS code is included, and accordingly the starting broadcast time which is already written in preset data memory 14 is rewritten in the VPS code, and in addition, the title of the program and the like are written in step S23. On the other hand, if the VPS code is not included, the timer preset mode is set, and accordingly only the title of the program is written in preset data memory 14 additionally in step S24. Then, the preset data are indicated on the preset program list in step S15.

According to the second embodiment, memory capacity of work memory 13 can be reduced because only the additional data are written in work memory 13. Also, the speed of reading/writing of the data can be increased due to the small amount of data to be processed at a time.

[Third Embodiment]

The VTR according to the third embodiment of the present invention will be described. The structure of the VTR according to the third embodiment is also similar to that of the first embodiment; hence, the reader should continuously refer to block diagram shown in FIG. 1 throughout the following discussion.

Generally, the teletext data includes the program list covering only a week. According to the first and second embodiments, when the user inputs the "G-code" printed on magazines, for example, three weeks in advance of the broadcasting date of a program, recording should be carried out based on the timer preset mode. Therefore, even when the VPS code is included in the video signal of the program, when the broadcast time of the program is changed, recording is not carried out accordingly. This inconvenience can be solved in the third embodiment which will be described below.

Figure 7A:
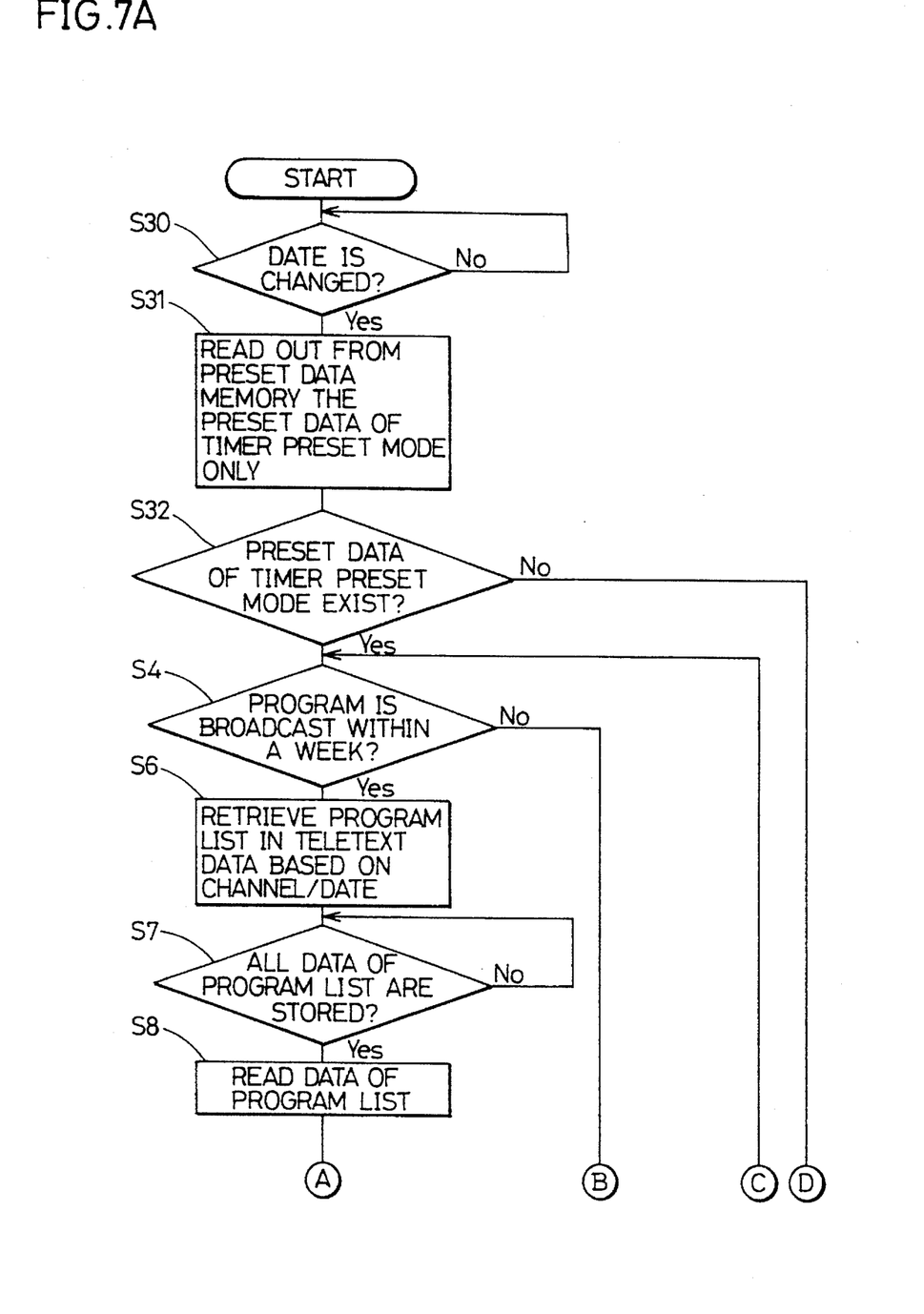
FIG. 7A and 7B are flow charts showing an operation of the VTR according to the third embodiment of the present invention.
Figure 7B:
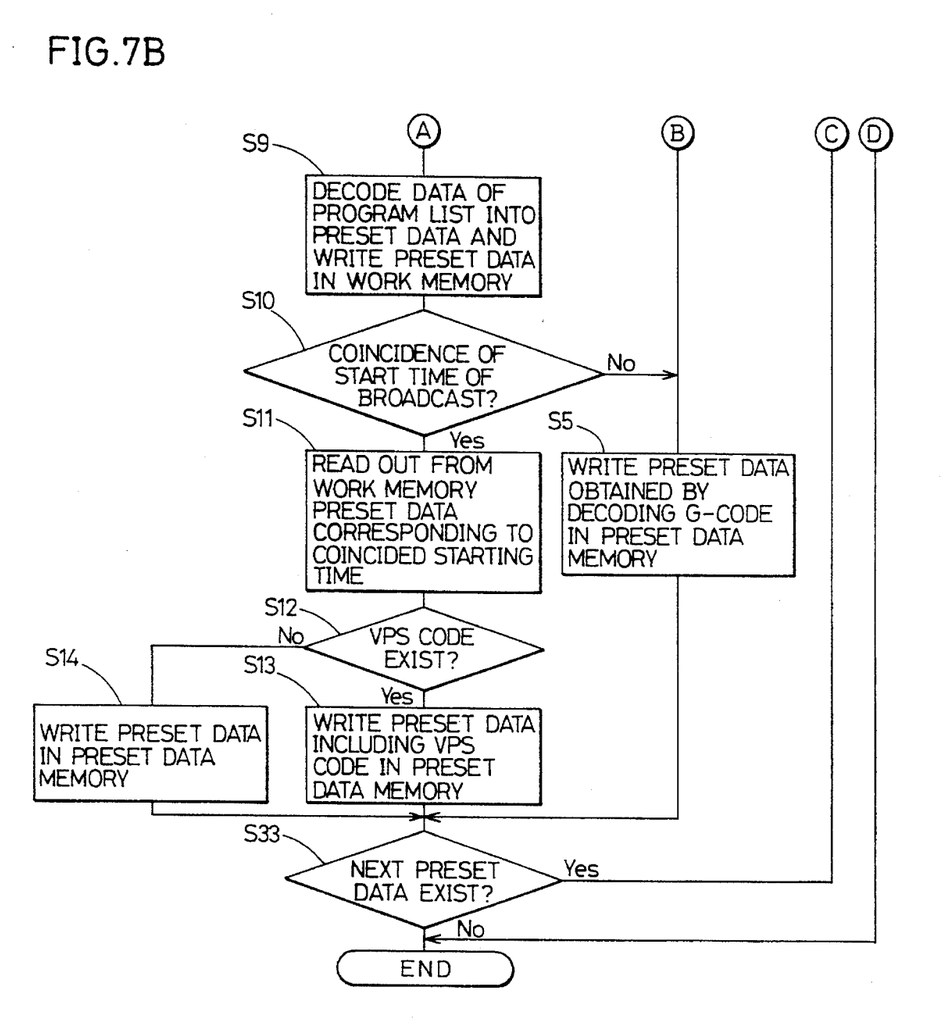

FIG. 7A and 7B are flow charts showing an operation according to the third embodiment. In FIG. 7A and 7B, the same reference characters are given to the steps corresponding to those shown in FIG. 2A and 2B.

Before these steps are carried out, several preset data have already been stored in preset data memory 14.

In step S30, preset control unit 20 determines whether the date of clock circuit 16 is changed or not. If the date is changed, in step S31, preset control unit 20 reads out only the preset data of the timer preset mode from the preset data already stored in preset data memory 14. In step S32, if preset data memory 14 does not include the preset data of the timer preset mode, the operation is completed. On the other hand, when preset data memory 14 includes the preset data of the timer preset mode, it is determined in step 54 whether or not the program in the preset data is to be broadcast within a week. The subsequent steps S5–S14 are similar to those shown in FIG. 2A and 2B.

After new preset data including, for example, the VPS code corresponding to the preset data are written in preset data memory 14 in these steps S4–S14, it is determined whether or not preset data memory 14 includes the subsequent preset data in step S33. If the subsequent preset data are included, the operation will be repeated from S4.

When the program list in the teletext data are retrieved and the desired program is detected from the program list, new preset data corresponding to the program are written in that address of preset data memory 14 from which the preset data are read out.

According to the third embodiment, even when the program to be recorded is broadcast more than a week later, and the timer of recording is preset temporarily by the "G-code", the program can be recorded appropriately even when the broadcast time of the program is changed by the broadcasting station because the preset data including the VPS code corresponding to the "G-code" are set.

Also, according to the third embodiment, preset using the program list included in the teletext is not required and becomes possible to preset always using the "G-code". Therefore, preset can be completed more quickly compared with the time consuming preset using the program list.

Although the title of the program is recorded before the program is recorded in the above first through third embodiments, the title of the program may not always be recorded. Also, the broadcasting channel, the name of the broadcasting station, and the time of recording and the like can be recorded in addition to the title of the program. In this case, these data are read out from preset data memory 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video tape recorder for recording a desired program to be broadcast by a broadcasting station, comprising:

means for supplying a program preset code entered by a user, said program preset code being a pre-defined multi-digit code which contains pre-defined encoded program data associated with the desired program and, when decoded, identifies the broadcasting station, and a date and a start time at which the desired program will be broadcast by the station;

means, responsive to said supplying means, for decoding the program preset code to yield said program data;

means for receiving a program list broadcast as teletext data by the station identified by said program data, said list containing a date, a start time and a program identifying code allotted to each one of a plurality of programs to be broadcast within a predetermined time period by the station, wherein said program list is multiplexed onto a signal broadcast by said station, and wherein, while said one program is being broadcast, the corresponding program identifying code for said one program is itself multiplexed, apart from the program list, onto the broadcast signal so as to distinguish said one program from every other program delineated in said list;

means for checking the date and start time in said program data against corresponding date and start time data for individual programs delineated in said program list in order to determine a coincidence between said program data and any one of said programs in said list;

a memory;

means, responsive to said checking means and in the event both the coincidence arises and the program identifying code exists within the program list, for storing, in said memory, at least the program identifying code, from the program list, for said any one program as the program identifying code for the desired program; and recording means for recording a corresponding broadcast program, as the desired program, if and when the program identifying code multiplexed on the broadcasting signal for the corresponding program coincides with the program identifying code stored within said memory;

wherein the program identifying code, contained in the teletext data, for said one program specified by the program preset code is stored within the memory and controls subsequent recording of the desired program.

2. The video tape recorder according to claim 1, wherein said program identifying code includes a video program system code.

3. The video tape recorder according to claim 1, wherein said program identifying code includes a program delivery control code.

4. The video tape recorder according to claim 1, wherein said program identifying code includes an extended data service code.

5. The video tape recorder according to claim 1 further comprising:

clock means for maintaining at least a current date; and means, responsive to said clock means, for causing said checking means to check the date and start time in said program data against the corresponding date and start time data for the individual programs in said program list whenever the date maintained in said clock means is changed.

6. The video tape recorder according to claim 1, wherein said program list further includes a title for the corresponding program, further comprising: means for recording the title prior to recording the corresponding program.

7. The video tape recorder in claim 8, wherein teletext data broadcast by said each one of a plurality of stations comprises a corresponding plurality of pages of data, further comprising:

means for presetting, for each of the plurality of stations, an associated initial page number so as to form a plurality of preset page numbers, wherein said associated page number identifies where a program list for said each station exists within the teletext data to be broadcast by said each station; and page selection means, responsive to received teletext data and to one of the preset page numbers associated with the station identified in the program data, for designating an initial page from the received teletext data so as to obtain said program list for the identified station.

8. A video tape recorder for recording a desired program to be broadcast by a broadcasting station, comprising:

means for supplying a program preset code entered by a user, said program preset code being a pre-defined multi-digit code which contains pre-defined encoded program data associated with the desired program and, when decoded, identifies the broadcasting station, and a date and a start time at which the desired program will be broadcast by the station;

means, responsive to said supplying means, for decoding the program preset code to yield said program data;

a memory;

first means for storing said program data in said memory;

means for receiving a program list broadcast as teletext data by the station identified by said program data, said list containing a date, a start time and a program identifying code allotted to each one of a plurality of programs to be broadcast within a predetermined time period by the station, wherein said program list is multiplexed onto a signal broadcast by said station, and wherein, while said one program is being broadcast, the corresponding program identifying code for said one program is itself multiplexed, apart from the program list, onto the broadcast signal so as to distinguish said one program from every other program delineated in said list;

means for checking the date and start time in said program data, stored within said memory, against corresponding date and start time data for individual programs delineated in said program list in order to determine a coincidence between said program data and any one of said programs in said list;

second means, responsive to said checking means and in the event both the coincidence arises and the program identifying code exists within the program list, for storing, in said memory, at least the program identifying code, from the program list, for said any one program as the program identifying code for the desired program; and recording means for recording a corresponding broadcast program if and when the program identifying code multiplexed on the broadcasting signal for the corresponding program coincides with the program identifying code stored within said memory;

wherein the program identifying code, contained in the teletext data, for said one program specified by the program preset code is stored within the memory and controls subsequent recording of the desired program.

9. The video tape recorder in claim 8, wherein teletext data broadcast by said each one of a plurality of stations comprises a corresponding plurality of pages of data, further comprising:

means for presetting, for each of the plurality of stations, an associated initial page number so as to form a plurality of preset page numbers, wherein said associated page number identifies where a program list for said each station exists within the teletext data to be broadcast by said each station; and page selection means, responsive to received teletext data and to one of the preset page numbers associated with the station identified in the program data, for designating an initial page from the received teletext data so as to obtain said program list for the identified station.

* * * * *